United States Patent [19]

Vairetti et al.

[11] 4,424,318

[45] Jan. 3, 1984

[54] CONTINUOUS PRODUCTION OF POLYMER BEADS OF CONTROLLED SIZE

[76] Inventors: Claude R. L. Vairetti, Ecole Boulloche, rue de chateau d'eau; Michel R. L. Desnoyers, 31, rue Emile DuFloye, Sinceny; Jack Carbonel, rue de Caumont, Ognes; Paul D. A. Grammont, 26, Place Saint-Momble, all of 02300 Chauny, France; Arkadyi B. Pachkov, Naoutchno-Issledovatelski Institut Plastmass, 35 Perovski Proezd, Moscow 111 112, U.S.S.R.; Vladimir A. Grigoriev, Naoutchno-Issledovatelski Institut Plastmass, 35 Perovski Proezd, Moscow, U.S.S.R.; Vladimir I. Firsov, Naoutchno-Issledovatelski Institut Plastmass, 35 Perovski Proezd, Moscow 111 112, U.S.S.R.

[21] Appl. No.: 305,647

[22] PCT Filed: Jun. 10, 1981

[86] PCT No.: PCT/EP81/00069

§ 371 Date: Sep. 18, 1981

§ 102(e) Date: Sep. 18, 1981

[87] PCT Pub. No.: WO81/03659

PCT Pub. Date: Dec. 24, 1981

[30] Foreign Application Priority Data

Jun. 13, 1980 [FR] France ................................ 80 13135

[51] Int. Cl.³ .............................................. C08F 2/20
[52] U.S. Cl. .......................................... 526/88; 526/64
[58] Field of Search .................................. 526/64, 88

[56] References Cited

U.S. PATENT DOCUMENTS

| | | | |
|---|---|---|---|
| 2,618,626 | 11/1952 | Van Dijk | 526/88 |
| 3,922,255 | 11/1975 | Koestler et al. | 260/80.78 |
| 4,360,651 | 11/1982 | Dinbergs | 526/88 |

FOREIGN PATENT DOCUMENTS 2184846 12/1973 France.

OTHER PUBLICATIONS

Chemical Abstracts, vol. 85, No. 14 (Oct. 4, 1976), p. 17, Abstract 94902a.

*Primary Examiner*—Paul R. Michl
*Attorney, Agent, or Firm*—William A. Skinner

[57] ABSTRACT

A process and apparatus for the continuous production of spherical polymer beads in a restricted size range. Monomer droplets are produced in said size range by subjecting a fine monomer dispersion containing a controlled amount of a surface protective agent to controlled coalescence during passage through a tube (11) under laminar flow conditions. The monomer droplets are delivered from the tube (11) to the top of a polymerizing column (12) of variable cross-section wherein they undergo suspension polymerization in a laminar liquid stream descending through the column. Further polymerization in a separate reactor (30a, 30b) provides the desired polymer beads.

15 Claims, 2 Drawing Figures

CONTINUOUS PRODUCTION OF POLYMER BEADS OF CONTROLLED SIZE

TECHNICAL FIELD

The present invention relates to the production of polymer beads and more particularly to the continuous production of spherical polymer beads of controlled size within a restricted size range.

BACKGROUND ART

Polymer beads of substantially uniform size and shape are required for various industrial applications such as the production of ion-exchange resins, or manufacturing processes involving molding or extrusion.

However, known processes which comprise polymerizing monomer droplets in suspension generally provide non-uniform polymer beads in a relatively broad size range, for example from about 0.1 mm to about 1.3 mm.

Subsequent screening steps are thus necessary in order to provide beads in several more restricted size ranges, which entails significant screening and storage costs, as well as the rejection of commercially unusable beads produced.

Uniform droplets may be produced by various known devices comprising for example calibrated tubes or vibrating nozzles which must be adapted to the droplet size required in each case, and are not particularly suitable for industrial manufacturing processes.

An investigation of the phenomenon of "limited coalescence" of oil droplets in water is discussed in an article by R. M. Wiley, published in the Journal of Colloid Science, Vol. 9, No 5, Oct. 1954, p. 427–437, and incorporated by reference herein. This article shows more particularly that a colloid or finely divided, dispersable solid agent, which will be called hereinafter a surface protective agent, is essential for coalescence up to a limiting droplet size which is directly proportional to the product of the dispersed (coalescing) phase volume and the solid particle size (colloid), and inversely proportional to the weight of solid colloid dispersed in the water.

It is nevertheless particularly difficult to produce uniform polymer beads since the monomer droplets in suspension should be kept as free as possible from collisions while they are slowly solidified in the course of polymerization. On the other hand, if the monomer droplets are suspended in an agitated liquid polymerizing medium, monomer droplets which undergo collisions while they are still liquid or in an intermediate gelled state may either break up into smaller droplets, or stick together to form larger droplets. U.S. Pat. No. 2,934,530 may be cited in this connection.

In addition, French Pat. Nos. 1,485,547 and 1,469,922, German Democratic Republic Patents No. 99386 and No. 61099, German Federal Republic published patent application DE-OS 2,402,674 may be cited to further illustrate the state of the art relating to suspension polymerization.

As may be seen from the above explanations and from the cited prior art, the continuous production of polymer beads of controlled size is particularly difficult to achieve on an industrial scale.

DISCLOSURE OF THE INVENTION

An object of this invention is to provide spherical polymer beads of substantially uniform controlled diameter in a restricted size range.

Another object of the invention is to provide a process for the continuous production of such uniform polymer beads of adjustable size in a reproducible manner, on an industrial scale.

A further object of the invention is to provide a simple apparatus for carrying out said process.

These objects are met by the process and apparatus in accordance with the invention as set forth in the claims.

Polymer beads are produced in accordance with the invention by a special combination of three successive but distinct stages which may each be carried out under optimum conditions, namely:

(a) In a first stage, uniform monomer droplets are continuously produced by controlled coalescence in a laminar liquid stream, while their size is essentially controlled via the proportion of dispersed surface protective agent added to the stream.

(b) In a second stage, these uniform monomer droplets are continuously converted into hardened beads by suspension polymerization in a laminar liquid stream for a relatively short period, for example of the order of one hour.

(c) In a third stage, the hardened beads are converted into polymer beads by prolonged polymerization, for example for 6–8 hours, whereby to ensure substantially complete conversion of the monomer remaining in the beads to the corresponding polymer.

As may be seen from the claims with reference to the description further below, these three stages may be readily carried out in a controllable manner by means of a relatively simple apparatus according to the invention, namely:

(a) A device for generating monomer droplets, comprising a coalescing tube connected to a mixing device associated with feed means for continuously supplying a controllable amount of a fine dispersion of monomeric starting material in a liquid medium containing various agents for promoting coalescence, and more particularly a controlled amount of colloidal surface protecting agent.

(b) A polymerizing column of variable cross-section increasing from top to bottom, associated with a liquid circulating system arranged to provide a heated liquid polymerizing medium circulating downwards through this column at a controlled rate, in the form of a laminar descending stream for effecting suspension polymerization in the column.

(c) One or more reactors suitable for prolonged polymerization of hardened beads discharged from said polymerizing column.

The suspension medium (L) employed for forming monomer droplets in accordance with the invention is preferably an aqueous solution comprising an ionizing agent (I) such as calcium chloride or any suitable salt, a pH adjusting agent (AD), a water-insoluble and water-dispersible surface-protective agent (P), such as bentonite for example, and if necessary an activating agent (AC) such as sodium lignosulfonate for example. The amount of surface-protective agent (P) which should be added to the suspension medium used for producing monomer droplets by coalescence in accordance with the invention will essentially depend on the desired droplet size and on the amount of monomer to be used for forming the droplets.

It may be established empirically from case to case by effecting relatively simple preliminary coalescence tests.

The polymerizing medium used for suspension polymerization in accordance with the invention is preferably a demineralized and degassed aqueous solution containing an ionizing agent such as calcium chloride, and a pH adjusting agent.

Said suspension medium used for controlled coalescence and said polymerizing medium circulated through the polymerizing column in accordance with the invention should have a density greater than the monomeric starting materials (M) employed. Most monomers of practical interest for use in the present invention have a density less than 1, so that water is advantageously used for said suspension and polymerizing media. Other liquids of higher density than the monomer in suspension may nevertheless be used in the invention, if necessary.

BEST MODE OF CARRYING OUT THE INVENTION

Figure 1:
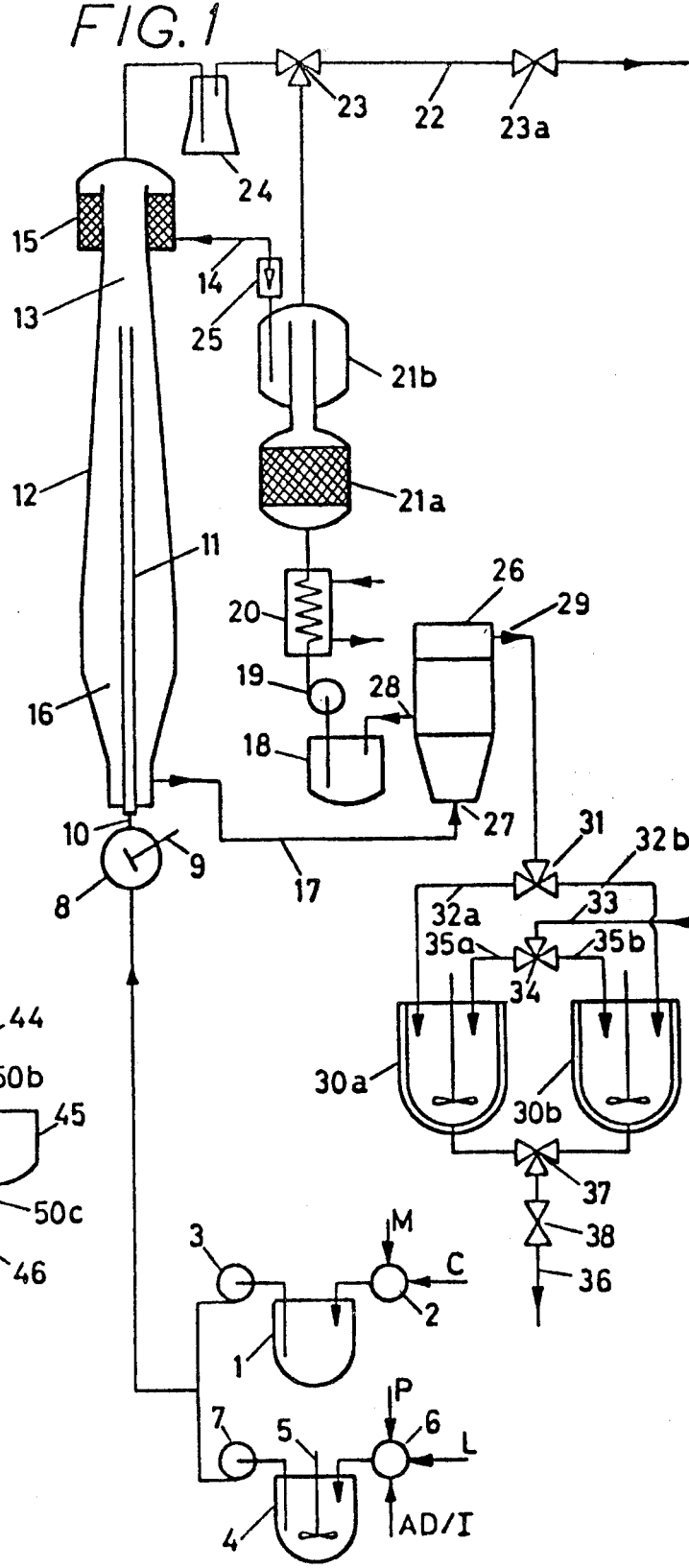
FIG. 1 of the accompanying drawings shows a schematic diagram of an apparatus for carrying out the invention.

The apparatus shown in FIG. 1 essentially comprises:

Monomer supply means comprising a monomer source, in this case a monomer reservoir 1 which receives a liquid monomer mixture of the monomeric starting material (M) required for producing the desired polymer beads and a suitable polymerization catalyst (C) from a mixing device 2, and a variable-delivery monomer metering pump 3 for continuously withdrawing from the reservoir 1 a controlled amount of the monomer mixture which is necessary for the desired production of polymer beads.

Means for supplying a liquid suspension medium which comprise: a reservoir 4 with a stirrer 5, which contains a mixture of a suspension liquid (L), a surface protective agent (P), if necessary an activating agent (AC), an ionizing agent (I), and a pH adjusting agent (AD), a mixing device 6 which delivers to the reservoir 4 this mixture containing predetermined amounts of the liquid (L) and said agents, and a variable-delivery suspension-medium metering pump 7 for continuously withdrawing from the reservoir 4 a controlled amount of the liquid suspension medium mixture.

A mixing device 8, comprising a vibrating paddle agitator 9 in this case, for continuously producing a fine dispersion of monomer droplets in the liquid suspension medium and delivering it continuously via an outlet 10.

A coalescing device comprising in this case a vertical tube 11 connected at its bottom end to the mixing device 8 and having an open top end for continuously delivering monomer droplets having reached an upper size limit by controlled coalescence under laminar flow conditions in the tube 11. The described coalescing tube 11 in combination with the mixing device 8 and the supply means 1-7 thus form a generator for continuously producing monomer droplets having a size which can be controlled by the relative amounts of the materials delivered by the supply means 1-7 via the metering pumps 3 and 7, and more especially the ratio P/M.

A polymerization column 12 having the tube 11 extending axially therein up to an admission zone 13 in the vicinity of the top of the column, an inlet line 14 connected to a liquid distributing head 15 for continuously providing a laminar stream of heated, polymerizing liquid entering into the admission zone 13 and descending through the column 12 under laminar flow conditions. The column 12 has a variable cross-section which increases progressively from top to bottom, so that the speed of the liquid decreases accordingly before reaching an exit zone 16 connected to a discharge line 17 at the bottom of the column.

A circuit for circulating the hot polymerizing liquid through the column 12 via the inlet line 14 and the discharge line 17, comprising: a reservoir 18 for said liquid, a variable-delivery circulating pump 19, a heating device 20, a degasser 21a, 21b connected to a gas discharge line 22 via a three-way gas valve 23 which also has an inlet connected to the liquid distributing head 15 via a flask 24, a flow-meter 25 for continuously monitoring the liquid flow-rate circulated through the column 12, and a centrifugal separator 26 having an axial bottom inlet 27 connected to the discharge line 17, a first outlet line 28 for returning the polymerizing liquid to the reservoir 18, and an outlet line 29 for the partly polymerized and hardened beads produced from the monomer droplets in the column 12.

Two polymerizing reactors 30a and 30b with heating jackets, which are respectively connected to the outlet line 29 via a three-way valve 31 and inlet lines 32a and 32b, to a liquid supply line 33 via a three-way valve 34 and inlet lines 35a and 35b, and to a polymer discharge line 36 via a three-way valve 37 and a closure valve 38. These two reactors are dimensioned and arranged to operate alternately, one being filled up while the other is in operation, so that polymer beads are continuously produced and intermittently discharged alternatively from these reactors.

The mode of operation of the described apparatus of FIG. 1 will be explained more fully with reference to the examples given further below.

Figure 2:
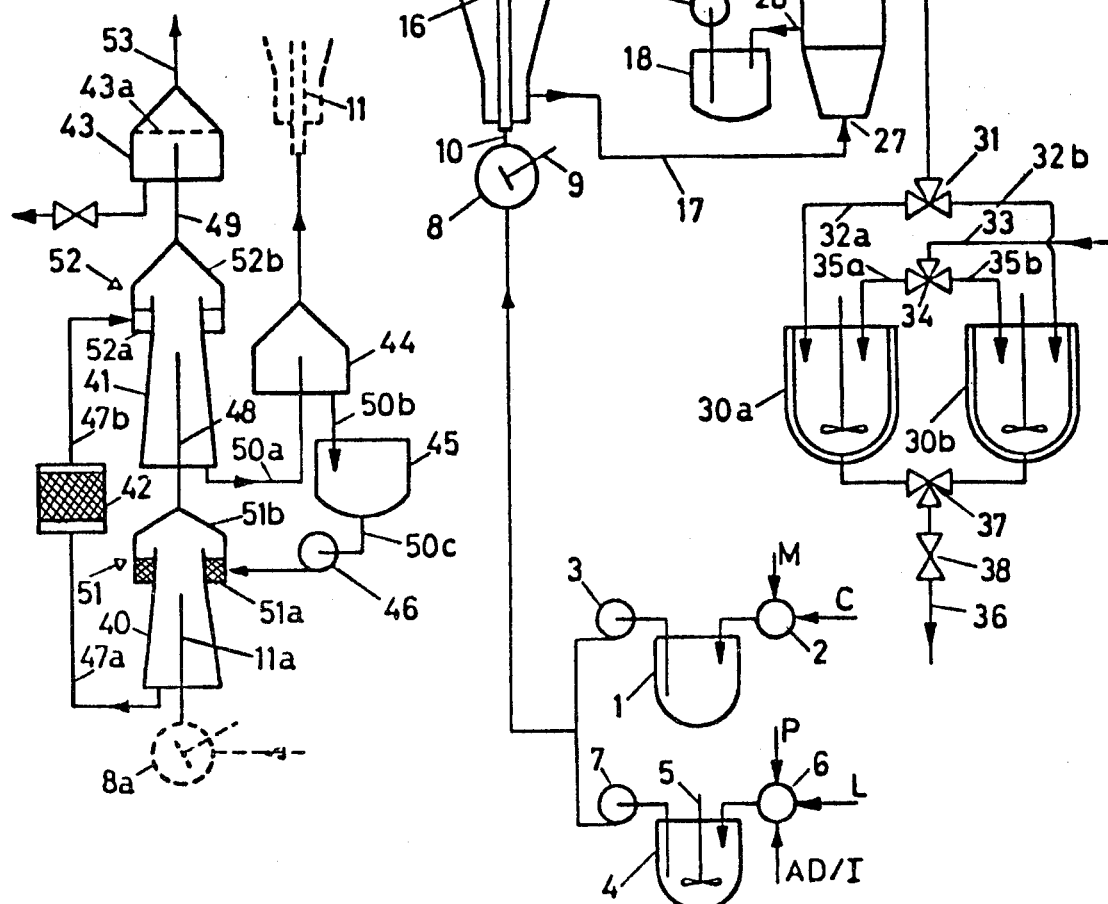
FIG. 2 shows a schematic diagram of a classifying device for sorting droplets formed by controlled coalescence and suspended in a liquid of higher density than the droplets, and more particularly for separating monomer droplets of intermediate size to be subjected to polymerization according to a variant of the apparatus shown in FIG. 1.

FIG. 2 shows an embodiment of a classifying apparatus for sorting droplets produced by coalescence in a liquid suspension medium of lower density, which may be usefully combined with the supply means 1-10 already described with reference to FIG. 1 in order to supply monomer droplets in a narrow intermediate size range.

The classifying apparatus shown in FIG. 2 comprises two droplet separators 40, 41 respectively associated with a mixer 8a and a coalescing tube 11a (corresponding respectively to 8 and 11 in FIG. 1), an auxiliary coalescer 42, two decanters 43, 44, a liquid holding tank 45, a variable-delivery circulating pump 46, and liquid conduits 47-50, 53.

As may be seen from FIG. 2, these droplet separators 40, 41 are each arranged in the form of a separating column which has a variable cross-section progressively increasing from top to bottom, are supplied at the top with liquid via distributing heads 51, 52, are respectively connected in series via an axial conduit 48 and recirculating conduits 47a, 47b associated with the auxiliary coalescer 42.

The first separating column 40 shown in FIG. 2 is continuously supplied from the mixer 8a with a fine dispersion produced by the means 1-9 already described (FIG. 1), while the coalescing tube 11a is in this case axially disposed in this separating column 40 so as to extend up to an admission zone at a short distance below the liquid distributing head 51 which is continuously supplied, via the reservoir 45 and pump 46, with a controlled amount of circulating liquid (e.g. water at ambient temperature). The liquid descending through the column in a laminar stream at a controlled, progressively decreasing speed is withdrawn from the bottom of this column 40 and recycled via the conduit 47a, the auxiliary coalescer 42 and conduit 47b to the distributing head 52 at the top of the second separating column 41.

As may further be seen from FIG. 2, the liquid distributing head 51 of column 40 comprises a lower admission zone containing any suitable packings, baffle or guide means 51a for substantially eliminating turbulence in the liquid supplied from the pump 46, via an inversed conical part 51b at the top of the distributor head 51, to the underlying admission zone of the separating column 40.

The coalescing tube 11a associated with the dispersion supply means 1-10 previously described thus likewise constitutes a droplet generator which is in this case associated with the first separating column 40 which serves to separate the smallest monomer droplets, for delivery via conduit 47a, from the largest and intermediate-size droplets for delivery at the top via conduit 48.

The second separating column 41 is generally designed in the same manner as the first column 40 already described, while the mode of separation is also generally similar in both columns 40 and 41. The liquid circulating downwards in a laminar stream through the second column 41 is continuously discharged from the bottom of this column via a conduit 50a and recirculated via the decanter 44, conduit 50b, reservoir 45, conduit 50c, pump 46, column 40, conduit 47a, auxiliary coalescer 42 and conduit 47b, back to the distributing head 52 of column 41.

The monomer droplets in a narrow, intermediate size range are separated by means of the second column 41, conducted via the conduit 50a to the decanter 44, and finally introduced via the conduit 10b and the axial tube 11 into the admission zone 13 at the top of the polymerizing column 12 (FIG. 1).

A conical portion 52b at the top of the distributing head 52 is connected axially via a conduit 49 to the decanter 43 which comprises a baffle 43a in the form of a grid or the like which serves to break up the largest monomer droplets, and further comprises an axial discharge outlet 53 which allows the discharged monomer to be recycled to the monomer supply means 1-3 (FIG. 1) and thereby ensure maximum economy of the monomeric starting materials used.

The separation of monomer droplets continuously delivered by the coalescing tube to the head of the first column 40 is controlled by means of the pump 46 which delivers the circulating liquid to the distributing head 51 at a controlled flow rate. This flow rate is selected so as to produce a laminar stream descending through the column 40 at a speed such that it is on one hand insufficient to overcome the buoyant force acting on the monomer droplets of large and intermediate size and that it is on the other hand sufficient to overcome the buoyant force acting on the smallest monomer droplets.

The first column 40 thus serves to separate the monomer droplets of large and intermediate size, which ascend by flotation and are transferred via the conical portion 51b and the tube 48, to the top end of the second separating column 41. On the other hand the smallest monomer droplets are driven downwards with the circulating liquid which is discharged from the bottom of column 40 and recirculated via conduit 47a, the auxiliary coalescer 42, and conduit 47b, to the distributing head 52 of the second separating column 41.

The second separating column 41 has a narrower cross-section than the first column 40 and is designed in such a manner that the circulating liquid descends through the second column at a speed which is on one hand selected so as to be sufficient to overcome the buoyant force acting on the droplets of intermediate size, which are thereby driven downwards and discharged via the conduit 50a with the circulating liquid, separated in the decanter 44, and continuously transferred via the top outlet to the bottom of the tube 11 axially arranged in the polymerizing column 12 (FIG. 1). The speed of the circulating liquid descending through the second column 41 is on the other hand selected so as to be insufficient to overcome the buoyant force acting on the largest monomer droplets, so that they ascend by flotation and are continuously discharged via the conduit 49 and the decanter 43, and recycled to the monomer feed means 1-3 as already mentioned.

Laminar flow conditions are essentially provided in the coalescing tube 11a, the separating columns 40, 41 and the intermediate conduit 48, so as to be able to thereby form the monomer droplets by controlled coalescence and to separate them in a laminar descending stream as described, thus effecting a "gentle" separation of the droplets whereby they are protected from being broken up by agitation.

The following examples serve to illustrate the production of polymer beads according to the invention, with reference to the described apparatus of FIG. 1.

EXAMPLE 1

Polymer beads consisting of a copolymer of styrene and divinylbenzene were continuously produced with an apparatus as described, comprising a polymerizing column 12 (FIG. 1) with a truncated portion of increasing cross-section having a height of 800 mm, a small diameter of 30 mm at the top end and a large diameter of 110 mm at the bottom.

A monomer mixture comprising: 710 ml styrene, 96 ml divinylbenzene at 61.7% and 2.8 g benzoyl peroxide was prepared, and stored in the monomer reservoir 1. A liquid suspension medium was also prepared by successively adding to 1 liter of demineralized water: 40 gr of technical calcium chloride, 5 ml of normal hydrochloric acid, 250 mg of bentonite and 200 mg of sodium lignosulfonate. This liquid suspension medium having a pH of 2.5 was stored in the reservoir 4. A liquid polymerizing medium was further prepared, by successively adding to 10 liters of boiled, demineralized water: 400 g of technical calcium chloride and 50 ml of normal HCl, so as to form a solution with a pH of 2.5, which was stored in the reservoir 18 for circulation through the polymerizing column 12.

To start up the operation of the apparatus, the polymerizing medium was circulated by the pump 19 at a rate of about 35 l/h, through the heat exchanger 20 wherein it was heated to 90° C., was degassed in the degasser 21a, 21b, and was passed through the polymerizing column 12 in the form of a laminar descending stream. The monomer mixture and the suspension medium were then respectively delivered to the mixing device 8, via the metering pump 3 at a rate of 250 ml/h for the monomer mixture, and via the metering pump 7 at a rate of 190 ml/h for the suspension medium.

The monomer mixture and suspension medium delivered to the mixing device 8 are violently agitated by the vibrating paddle 9 to form a fine dispersion of monomer droplets in the suspension medium, which directly passes into the bottom of the coalescing tube 11 (inner diam. 4 mm, height 800 mm). This fine dispersion rises slowly upwards in the form of a laminar stream through the tube 11 wherein the finely dispersed monomer droplets undergo controlled coalescence so that their size increases up to a limiting diameter when the protective agent present in the suspension medium has been completely taken up by the droplets.

The resulting monomer droplets are continuously delivered via the tube 11 to the admission zone 13 at the top of the polymerizing column 12 wherein they are suspended in equilibrium by the liquid stream descending through the column 12 under laminar flow conditions. The monomer droplets are thus subjected to suspension polymerization, whereby they are progressively hardened. The density of the monomer droplets thus increases as their polymerization progresses, so that they are displaced downwards through different equilibrium positions, whereby they slowly sink through the column 12. The resulting hardened beads reaching the exit zone 16 are continuously discharged in the polymerizing liquid medium leaving the column 12, are separated out in the centrifugal-separator 26, and are finally sent to one of the polymerization reactors 30a, 30b, wherein they were converted into solid polymer beads by polymerization for 8 hours in water at 90° C.

The resulting polymer beads were separated by filtration, washed with distilled water and finally subjected to granulometric analysis, which showed that 99% of the beads produced as described had a diameter lying between 0.4 and 0.8 mm.

EXAMPLE 2

Polymer beads were produced in the manner described in Example 1, except that the feed rate of the suspension medium was here increased to 225 ml/h.

Analysis of the polymer beads produced in this case showed that 99% of these beads have a diameter between 0.3 mm and 0.6 mm.

A comparison of this result with Example 1 shows that the polymer bead size is reduced when the amount of suspension medium and hence the proportion of surface protective agent contained therein is increased, as may be expected according to the principles of controlled coalescence underlying this invention.

EXAMPLE 3

Polymer beads were produced in the manner described in Example 1, except that the amount of sodium lignosulfonate was increased to 450 mg/liter.

Analysis of the polymer beads produced in this case showed that more than 90% of these beads have a diameter above 0.12 mm and that their mean diameter is 0.16 mm, i.e. 50% of the beads being larger and 50% smaller than this mean diameter.

It may thus be seen from this example that an increase of the proportion of sodium lignosulfonate results in a reduction of the polymer bead size. This size decrease may be attributed on one hand to an increased activating effect on the bentonite used as the surface protective agent due to the greater proportion of sodium lignosulfonate employed as an activating agent.

Experiments carried out within the framework of this invention have moreover shown that sodium lignosulfonate may be successfully employed, without any other surface protective agent or activating agent, to ensure controlled coalescence according to the invention.

Consequently, the reduced bead size obtained in the present example may well be attributed on the other hand to the face that sodium lignosulfonate itself likewise serves here both as a surface protective agent and as an activating agent for bentonite.

EXAMPLE 4

Polymer beads were produced in the same way as in Example 1, except that the proportions of bentonite and sodium lignosulfonate were respectively decreased to 100 mg/liter and 25 mg/liter.

Analysis of the polymer beads produced in this case showed that more than 90% of these beads have a diameter greater than 0.75 mm and that their mean diameter is 1.4 mm, i.e. 50% of these beads being larger and 50% smaller than this mean diameter.

A comparison of this result with the preceding examples shows that the polymer bead size increases when the proportion of protective agent is decreased, as may likewise be expected according to the principles of controlled coalescence underlying the present invention.

EXAMPLE 5

Macroporous polymer beads were produced under the conditions described in Example 1, except for the fact that the monomer mixture used in this case comprised: 401 ml styrene, 124 ml divinylbenzene at 61.7%, 3.6 g benzoyl peroxide, and 281 ml octoic acid (as a pore-forming agent).

Analysis of the resulting product showed that 99% of the macroporous beads produced in this case had a diameter lying between 0.4 and 0.8 mm, a specific pore volume of 900 mm$^3$ per gram of the dry polymer product and a specific surface of 30 m$^2$ per gram of the dry polymer product.

EXAMPLE 6

Polymer beads consisting of a linear polystyrene and having a sufficiently small size suitable for processing by molding or extrusion, are produced from a monomer mixture comprising: 710 ml styrene, 1.2 g benzoyl peroxide (catalyst), 1.6 g tert-butyl hydroperoxide (catalyst), and 3 g of dodecylmercaptam (surfactant to promote subsequent molding).

The polymer beads were produced in substantially the same way as described in the preceding examples. The composition of the suspension medium and the polymerizing medium as well as the operating conditions were the same as in Example 1, except that the flow rate of the suspension medium was 300 ml/h in the present case.

Analysis of the beads produced here showed that 96% of these beads have a diameter lying between 0.28 mm and 0.50 mm.

The polymer beads produced in accordance with the invention as illustrated by the above examples, exhibit perfectly spherical shape, as may be seen under magnification with a microscope.

As moreover may be seen from the foregoing and particularly from the above examples, such polymer beads may be continuously produced with a substantially uniform diameter within a restricted size range which can be controlled in each case by simply varying the process parameters, while uniform beads may be produced in each case, which are as small as 0.1 mm, as large as 1 mm or more, or in any intermediate narrow size range.

It has also been established that the production efficiency is nearly 100%, i.e. the monomeric starting material used to carry out the present invention is practically converted completely to a useful product in the form of polymer beads in a narrow, controllable size range.

The present invention thus provides various technical and economic advantages which are essentially due to said special combination of controlled coalescence with controlled polymerization, namely for example:

(a) Uniform polymer beads can be continuously produced in different, narrow size ranges by means of a relatively simple apparatus whereby the desired bead size may be selectively controlled via the operating parameters only.

(b) Practically complete conversion of monomer starting materials into polymer beads of any desired narrow size range, hence maximum economy of starting materials and final products.

(c) Possibility of continuously manufacturing beads on an industrial scale with a high degree of reproducibility and with minimum mixing of droplets undergoing both controlled coalescence and subsequent suspension polymerization under laminar flow conditions.

The principles of controlled coalescence and suspension polymerization underlying the invention are by no means limited to the production of given types of polymers.

It is thus understood that the above examples solely serve to illustrate the invention and are by no means limiting with regard to the liquid compositions, operating conditions, apparatus used, or final product.

It may thus be seen that any suitable monomers may be used to produce different types of polymers in accordance with the invention, for example monovinyl-monomers such as: styrene, acrylic or methacrylic acids or esters, vinyltoluene, acrylonitrile, methacrylonitrile, vinylpyridines, and polyvinyl monomers such as: divinylbenzene, trivinylbenzene, divinylnaphthalenes, diacrylate ethylene glycol, dimethylacrylate ethylene glycol, n.n-methylene-acrylamides.

INDUSTRIAL APPLICABILITY

Polymers may be produced in accordance with the invention in the form of uniform spherical beads in any desired restricted size range, and may be advantageously used for various applications, for example for the manufacture of various industrial products such as: ion exchange resins of porous (gel type) or macroporous (macroreticular) structure, non-ionic, adsorbant (macroreticular) resins, or else molded or extruded articles.

We claim:

1. A continuous process for the production of spherical polymer beads within a restricted size range, characterized by the steps of:

(a) continuously producing spherical monomer droplets within said size range by controlled coalescence of at least one monomer (M) finely dispersed in a laminar stream of a liquid suspension medium (L) having a higher density than said monomer and containing an ionizing agent (I), a pH adjusting agent (AD), and a surface protective agent (P) finely dispersed in said liquid medium in an amount selected in such a manner that the monomer finely dispersed in said laminar stream is continuously converted by coalescence into spherical droplets of increasing size until they have substantially taken up all of said dispersed protective agent (P) and thereby reach a limiting diameter within said restricted size range;

(b) continuously introducing the resulting monomer droplets at the top of a polymerizing column (12) while circulating a laminar stream of heated liquid polymerizing medium descending through the column at a controlled speed selected so as to balance the buoyant force acting on the monomer droplets, and to thereby maintain them in suspension in said laminar stream for a sufficient time for them to undergo polymerization until they are converted into hardened beads; and (c) continuously discharging the hardened beads from the bottom of the column and subjecting them to further polymerization for a sufficient time to convert them to the desired polymer beads.

2. The process of claim 1, characterized in that said controlled coalescence step (a) is affected in a vertical tube (11) through which said laminar liquid stream containing the finely dispersed monomer is continuously caused to flow upwards at a controlled speed providing laminar flow conditions in said tube.

3. The process of claim 2, characterized in that said tube (11) is axially arranged within said polymerizing column (12) so that the monomer droplets continuously produced by controlled coalescence are directly delivered from the top end of said tube to an admission zone (13) in the vicinity of the top of said column.

4. The process of claim 1 or 3, characterized in that said hardened beads discharged from the bottom of the polymerization column (12) are continuously separated from the liquid polymerizing medium which is recirculated to the column, and the separated beads are continuously delivered to a heated reactor (30a, 30b) equipped with a mixing device and supplied with a liquid for suspending said beads.

5. The process of claim 1, characterized in that said liquid polymerizing medium is heated to a temperature suitable for promoting polymerization of the monomer droplets in said column (12).

6. The process of claim 5, characterized in that said liquid polymerizing medium contains an ionizing agent.

7. The process of claim 6, characterized in that said liquid polymerizing medium and said suspension medium contain the same ionizing agent (I).

8. The process of claim 7, wherein said ionizing agent is calcium chloride.

9. The process of claim 1 or 8, characterized in that said suspension medium contains bentonite and/or lignosulfonate as the surface protective agent (P) and/or the activating agent (AC).

10. The process of claim 1, characterized in that said suspension medium is an aqueous solution.

11. The process of claim 1 or 10, characterized in that said suspension medium contains said surface protective agent in an amount corresponding to 0.1 to 0.7 grams/liter.

12. The process of claim 11, characterized in that said suspension medium contains said pH adjusting agent (AD) in an amount sufficient to provide a slightly acid pH in said medium.

13. The process of claim 12, characterized in that said pH adjusting agent provides a pH of 2.5 in said suspension medium.

14. The process of claim 1, characterized in that said polymerization medium contains a pH adjusting agent.

15. The process of claim 14, characterized in that said suspension medium and said polymerizing medium contain the same pH adjusting agent.

* * * * *